United States Patent [19]

King

[11] Patent Number: 4,979,660

[45] Date of Patent: Dec. 25, 1990

[54] LUGGAGE SECURER

[76] Inventor: Steven King, 8731 Parkmont, Wichita, Kans. 67207

[21] Appl. No.: 182,882

[22] Filed: Apr. 18, 1988

[51] Int. Cl.$^5$ .............................................. B60R 9/00
[52] U.S. Cl. .................................. 224/309; 224/273; 248/363
[58] Field of Search ........................... 224/273, 309; 248/359 A, 362, 363, 309.3; 123/198 R, 198 C; 180/178; 137/482, 487.5, 907

[56] References Cited

U.S. PATENT DOCUMENTS

| | | | |
|---|---|---|---|
| 1,998,761 | 4/1935 | Hueber | 123/198 C |
| 2,009,721 | 7/1935 | Williams | 224/309 |
| 2,123,549 | 7/1938 | Williams | 248/363 |
| 2,615,299 | 10/1952 | Holmes | 123/198 C |
| 4,070,001 | 1/1978 | Musgrove | 137/907 |
| 4,756,234 | 7/1988 | Anderson | 180/178 |
| 4,785,851 | 11/1988 | Peacock | 137/907 |
| 4,790,403 | 12/1988 | Akita et al. | 180/176 |

FOREIGN PATENT DOCUMENTS 3023172 1/1982 Fed. Rep. of Germany ...... 224/309

Primary Examiner—Ernest G. Cusick
Assistant Examiner—Glenn T. Barrett
Attorney, Agent, or Firm—John Wade Carpenter

[57] ABSTRACT

A luggage securer which uses the vacuum of an engine in order to steadfastly hold an article to a predetermined location on a vehicle. The luggage securer includes a vacuum receiving chamber, and a conduit which extends from the vacuum source to the vacuum receiving chamber. At least one valve is disposed within the conduit. At least one other conduit extends from the vacuum receiving chamber to the predetermined location on the vehicle where the article is to be steadfastly held.

5 Claims, 3 Drawing Sheets

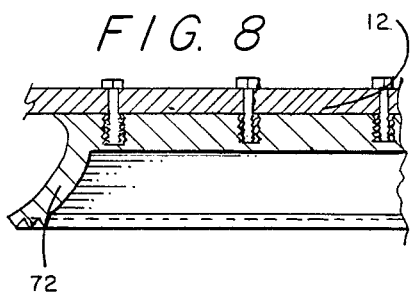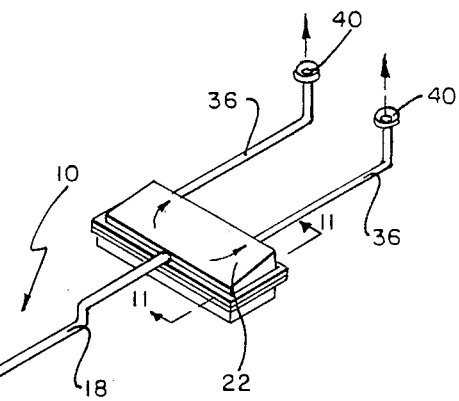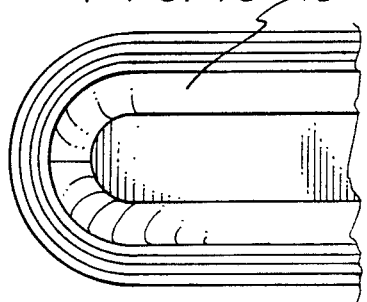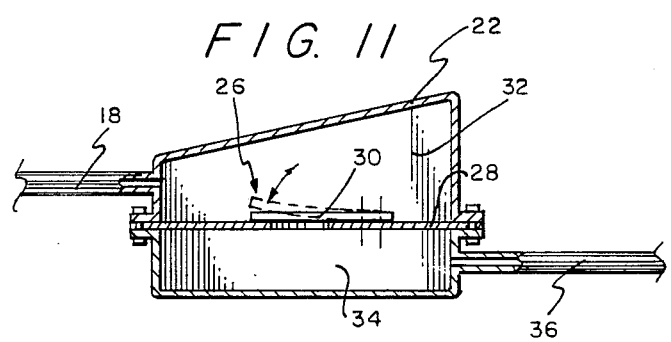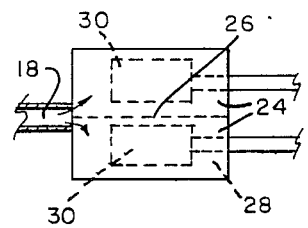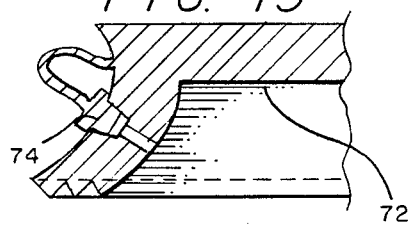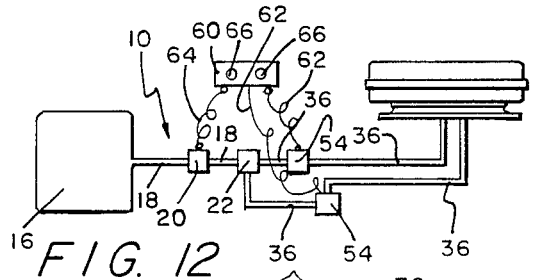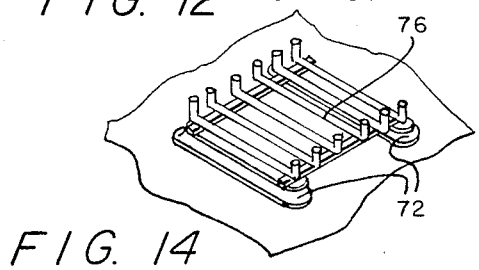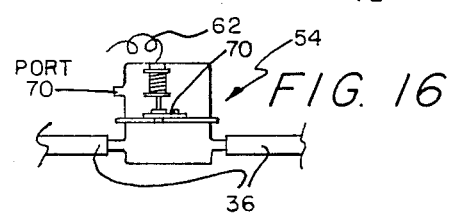

LUGGAGE SECURER

FIELD OF THE INVENTION

This invention is related to a means for retaining luggage and the like to a vehicle. More specifically, this invention provides for a luggage securing means which secures luggage and the like to a vehicle using the vacuum source provided by the engine.

DESCRIPTION OF THE PRIOR ART

A patentability investigation was conducted and the following was discovered: Williams U.S. Pat. No. 2,009,721. The prior art patent does not teach or suggest the particular luggage securer of this invention.

SUMMARY OF THE INVENTION

The present invention broadly accomplishes its desired objects by providing a retainer means for securing an article of commerce, such as suitcases and the like, to a vehicle. The retainer means comprises a vehicle means having an engine which provides a vacuum source means. A vacuum receiving chamber means is also provided, along with a conduit that extends from the vacuum source means to the vacuum receiving chamber means. At least one valve is disposed within the conduit, and at least one second conduit extends from the vacuum receiving chamber means to a predetermined location on the vehicle, such as the trunk lid, etc. In a preferred embodiment of the invention, there is a pair of second conduits that extend from the vacuum receiving chamber to the predetermined location on a vehicle. Optionally, each of the second conduits comprise a back pressure valve means.

In a more preferred embodiment of the present invention, the retainer means additionally comprises an article of commerce disposed over the predetermined location in order to be engaged to the vehicle at the predetermined location by the vacuum source means. Secured to the bottom of the article of commerce is at least one suction cup. The suction cup is disposed over the end of the second conduit such that vacuum source being transmitted by the second conduit is applied to the suction cup over the predetermined location in order to retain the article of commerce thereat. The article of commerce may include an accessible compartment, and a conduit extending from the accessible compartment to the suction cup so as to communicate with the latter. A compartment valve is disposed at the end of the conduit within the accessible compartment; the valve would be for releasing any vacuum within the suction cup such that the article of commerce could be readily removed off of the predetermined location. Alternatively, each of the suction cups may include a suction valve positioned within the walls of the suction cup in order to release the vacuum within the suction cup without the need for an accessible compartment within the article of commerce.

The vacuum receiving chamber preferably includes a pair of back pressure valves in communication with all conduits extending thereto and therefrom. A solenoid regulator means may be employed in order to electrically engage any valves within any conduit. The solenoid regulator means could be formed such as to have switches that are exposed on the dashboard of a vehicle.

It is therefore an object of the present invention to provide a retainer means or a luggage securing means which employs the use of a vacuum source means provided by the engine of a vehicle.

These, together with the various ancillary objects and features which will become apparent to those skilled in the art as the following description proceeds, are attained by this novel luggage securing means, a preferred embodiment being shown with reference to the accompanying drawings, by way of example only, wherein:

BRIEF DESCRIPTION OF THE DRAWINGS

FIG. 8 is a partial vertical sectional view of the bottom of the article of commerce having secured thereto by bolts a suction cup;

FIG. 9 is a perspective view of one embodiment of the present invention;

FIG. 10 is a bottom plan of the suction cup of FIG. 8;

FIG. 11 is a vertical sectional view taken in direction of the arrows and along the plane of line 11—11 in FIG. 9;

FIG. 12 is a schematic diagram of another embodiment of the present invention which employs a solenoid regulator;

FIG. 13 is a partial vertical sectional view of the suction cup having a removable disposed stopper through a wall thereof in order to provide a means for releasing a vacuum source underneath the suction cup;

FIG. 14 is a partial perspective view of the suction cup secured to a luggage rack;

FIG. 15 is a partial top plan view of the vacuum receiving and channeling means of FIGS. 9 and 11 with the dotted lines representing the diaphragm of a back pressure valve means more clearly depicted in FIG. 11;

FIG. 16 is a partial vertical sectional view of a deactivating valve which can deactivate the vacuum source means to an article of commerce; and FIG. 17 is a partial vertical sectional view of an activating valve which activates or transmits a vacuum source from the engine to the vacuum receiving and channeling means and eventually to the article of commerce.

DETAILED DESCRIPTION OF THE INVENTION

Figure 1:
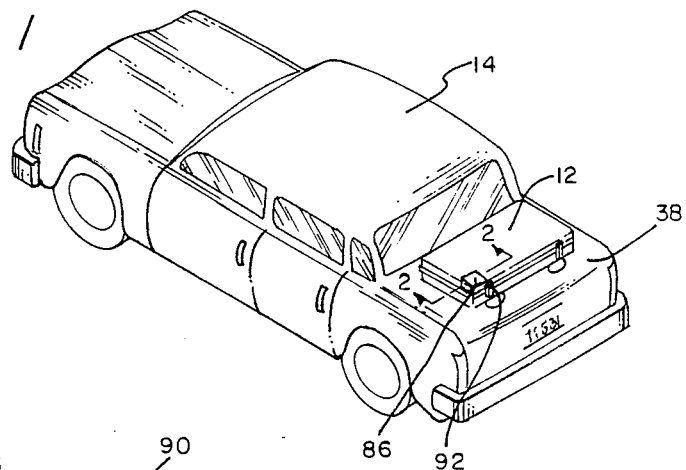
FIG. 1 is a perspective view of an automobile having a suitcase secured to the trunk lid thereof.

Referring in detail now to the drawings wherein similar parts of the invention are identified by like reference numerals, there is seen an apparatus (or retainer), generally illustrated as 10 in FIGS. 9 and 12, for securing an article 12 (e.g. a suitcase, skiis, athletic equipment, etc.) to a vehicle 14 (i.e., a car, truck, etc.) having an engine 16 which provides a vacuum source, Secured to the engine 16 and in communication with the vacuum source is a conduit 18 which has a regulator valve 20 and terminates in a vacuum receiving and channeling chamber means, generally illustrated as 22. In a preferred embodiment of the invention, the chamber means comprises a pair of chambers 24—24 separated by upright partition 26 and in communication with the conduit 18 wherethrough a vacuum is being transmitted. Each of the chambers 24 preferably has a back pressure valve 26 that includes a transverse partition 28 and a diaphragm 30. Transverse partition 28 separates or divides each of the chambers 24 into a pair of volumetric portions 32 and 34 (i.e. an upper chamber 32 a and lower chamber 34 or portion). Diaphragm 30 lifts upwardly within upper chamber 32 (see FIG. 11) in response to vacuum through conduit 18, such that the vacuum can be transmitted or applied to and within the lower chamber 34. Extending outwardly from the vacuum receiving and channeling chamber means 22 and in communication with each of the lower chambers 34 is a conduit 36. Conduits 36—36 extend to a predetermined location (e.g. a trunk lid 38) on the vehicle 14. As vacuum is transmitted or applied to and within the lower chamber 34, the vacuum causes a suction at the end of each of the conduits 36—36. It is this suction that retains or holds the article 12 to the vehicle.

In one preferred embodiment of the invention, each of the conduits 36 terminates in a suction cup 40 that is aligned or registered with the planar surface of the trunk lid 38. Underneath each of the cups 40—40 may be (optionally) a back pressure valve 42 comprising a housing 44 with a hollow neck 46 attached to and communicating with conduit 36, a spring 48 seated in the housing 44, and a ball 50 that is spring biased by spring 48 such as to seat over an aperture 52 that forms part of the bottom of each of the suction cups 40. As such or vacuum is transmitted or formed within conduit 36, ball 50 is sucked or pulled downwardly to allow the suction or vacuum to transpire through or out of the aperture 52, enabling the suction or vacuum to engage any article 12 imposed over the cups 40—40.

In another preferred embodiment of the present invention, valve means 54 are installed in each of the conduits 36. Valve means 54—54 and valve means 20 preferably connect to a solenoid regulator 60 via electrical conductors 62-62 and electrical conductor 64 respectively. Solenoid regulator 60 includes switches 66—66 that are exposed on the dashboard of the vehicle 14. In response to pushing a switch 66, solenoid 60 activates valve 20 by opening a rubber or vinyl valve 68 along a vacuum to be applied to and through conduit 13, chamber 22, and conduits 36—36. In response to pushing another switch 66, solenoid 60 would deactivate the valves 54—54 by opening a rubber or vinyl valve 70 which allows ambient air and pressure to pass through port 70 and into conduit 36, causing the system to equalize and allowing the article 12 to be removed. When valves 20 and 54—54 are employed, preferably the conduits 36 would not employ back pressure valves 42—42 since the latter would not necessarily allow the entire system to equalize as the space between cups 40—40 and article 12 could still be under a vacuum and article 12 could not be removed.

Figure 2:
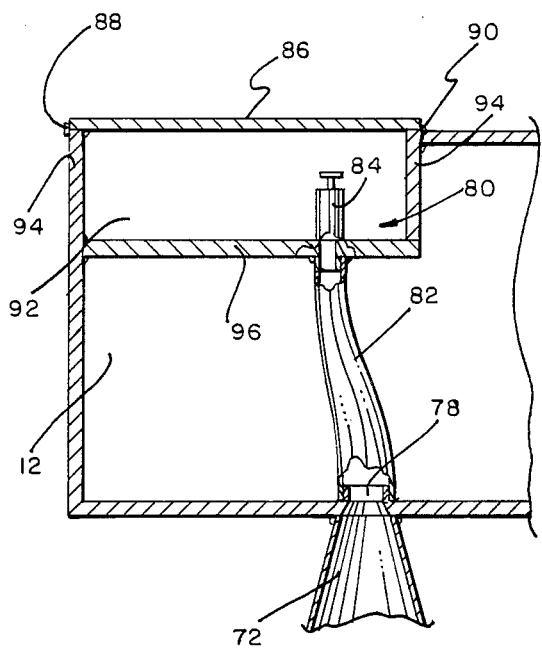
FIG. 2 is a partial vertical sectional view taken in direction of the arrows and along the plane of line 2—2 in FIG. 1.
Figure 3:
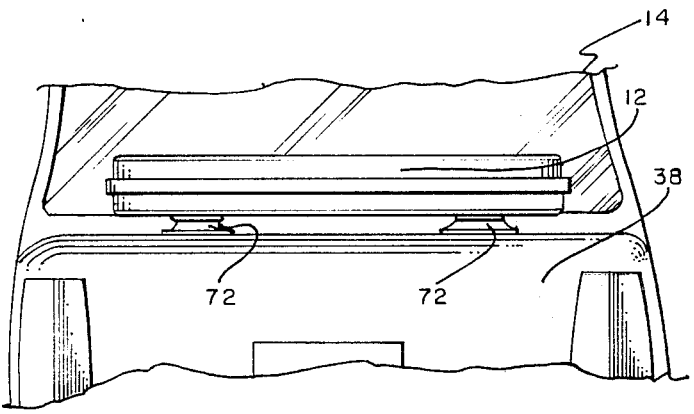
FIG. 3 is a partial rear elevational view of the vehicle of FIG. 1 and includes the rear elevational view of the article of commerce secured through the trunk lid of the vehicle.
Figure 4:
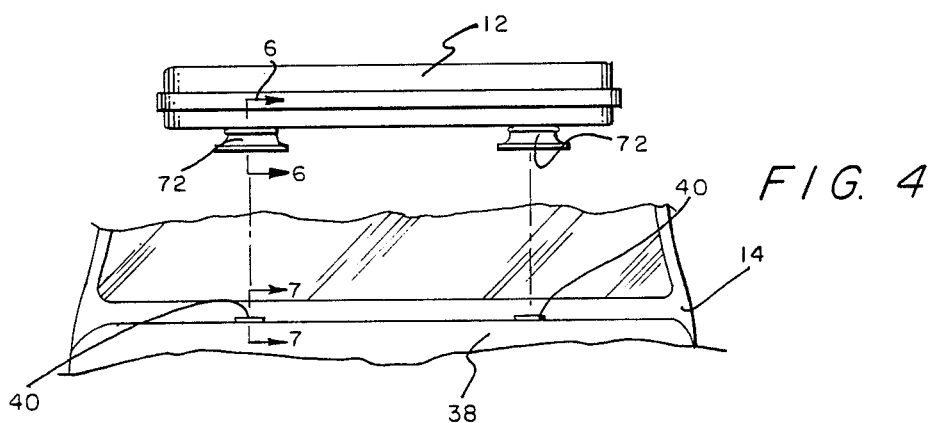
FIG. 4 is a segmented rear elevational view of the vehicle and article of commerce in FIG. 3, with the article of commerce separated from the trunk lid of the vehicle.
Figure 5:
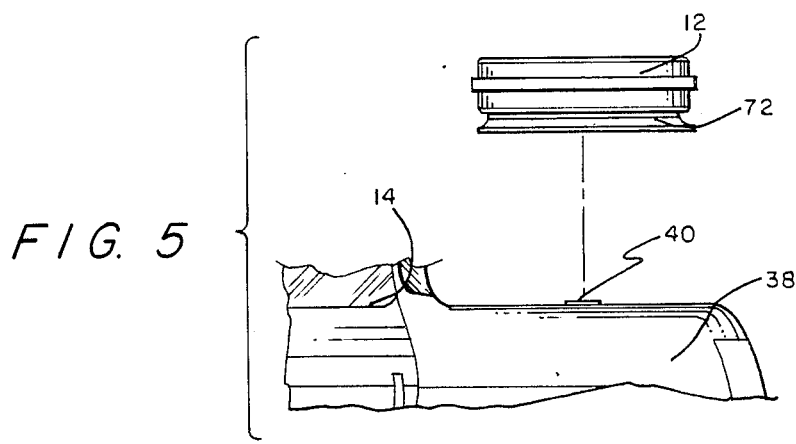
FIG. 5 is a side elevational view of the vehicle and the article of commerce of FIG. 4.
Figure 6:
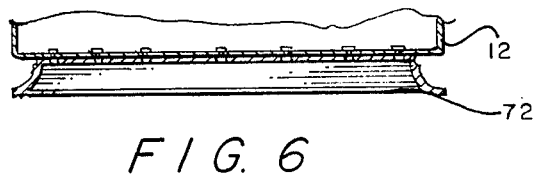
FIG. 6 is a vertical sectional view taken in direction of the arrows and along the plane of line 6—6 in FIG. 4.
Figure 7:
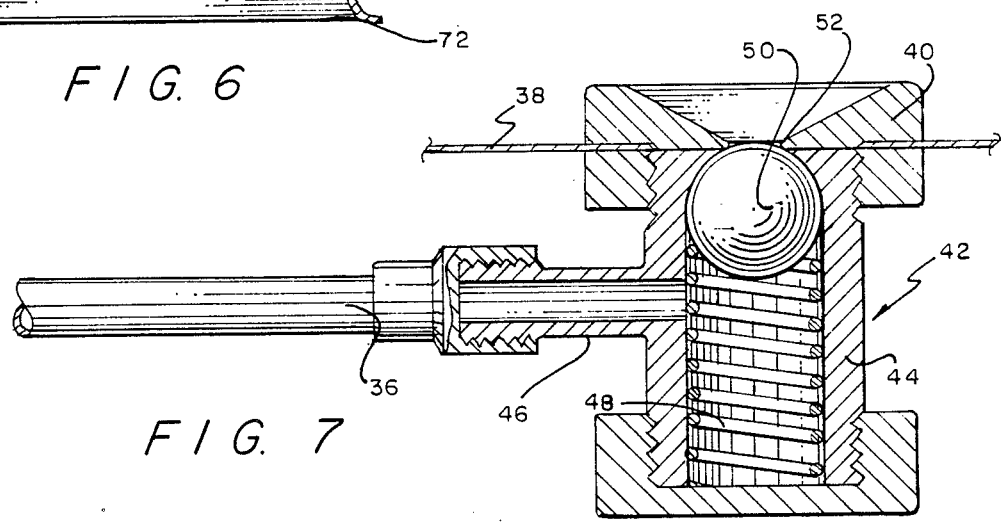
FIG. 7 is a vertical sectional view taken in direction of the arrows and along the plane of line 7—7 in FIG. 4.

The article 12, which as indicated is preferably a suitcase, has a pair of suction cups 72—72 secured to the bottom thereof. Each of suction cups 72—72 may include a valve 74 for releasing ambient pressure thereto (see FIG. 13). In an alternative embodiment, suction cups 72—72 are secured to an article luggage rack 76 (see FIG. 14). In still yet another embodiment, the article 12 has an aperture 78, a compartment 80 and an article conduit 82 interconnecting compartment 80 with the aperture (see FIG. 2). At the compartment end of the conduit 82 is a vacuum release valve 84 which is accessible when a pivotal lid 86 is raised. Lid 86 has a lock 88 (hook, etc.) at one end and a hinge 90 at another end. Compartment 80, in addition to having a top defined by lid 86, has a pair of side walls 92—92 (with one of the side walls 92 being defined by a top side of the article 12), a pair of end walls 94—94, and a bottom 96 connecting to the side walls 92—92 and to the end walls 94—94. When it is desired to release a vacuum within suction cup 72, lid 86 is elevated and valve 84 is turned to produce ambient pressure 92 within cup 72. The embodiment of the invention is an alternate to the embodiment of the suction cup 72 (see FIG. 13) with valve 74. Both embodiments may be employed either alone or with the other embodiments of the invention (e.g. with the back pressure valve 42 of FIG. 7, and/or with the control operation in FIG. 12).

Thus, by the practice of this invention, there is provided a retainer means or luggage securing means that transmits a vacuum source means from an engine of a vehicle to a predetermined location on the vehicle in order to secure thereto the luggage, suitcase, bicycle racks, ski racks, etc. In the broadest aspects of the present invention, a single conduit extends from the engine to the suction cups underneath the article to be secured to the vehicle. In a more narrow aspect of the present invention, the article of commerce is designed with a rubber seal or suction cup on the bottom thereof to provide a vacuum cavity when a vacuum source is transmitted thereto. A vacuum line would extend from the engine through two electrically controlled solenoid valve means, a reed valve disposed between the two electrically controlled solenoid valve means, and through a small vacuum port on the trunk lid of the vehicle. The solenoid valve means would allow the system to be controlled from the control panel or dashboard of the vehicle. The suitcase would be disposed on the trunk lid such that the rubber seal or suction cup on the bottom thereof would superimpose the vacuum port in the trunk lid. After the engine is started, a switch would be depressed to activate a solenoid valve means which enables the vacuum source to pass through the reed valve, a release solenoid valve means, and to the underside of the rubber seal or suction cup. The purpose of the reed valve (or vacuum receiving and channeling chamber means) is to allow the vacuum to remain on the system even if the engine is shut off. When it is desired to remove the luggage, a second switch is depressed in order to deactivate the vacuum via the release solenoid valve means.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A retainer means for securing an article of commerce to a vehicle comprising a vehicle means having an engine which provides a vacuum source means;

a vacuum receiving chamber means;

a first conduit means extending from the vacuum source means to the vacuum receiving chamber means;

at least one valve means disposed within said first conduit means; and at least one second conduit means extending from said vacuum receiving chamber means to a predetermined location on the vehicle means; and a solenoid regulator means electrically engaged to said valve means for operating the opening and closing of the same;

a pair of second conduit means each having a back pressure valve means and extending from said vacuum receiving chamber to said predetermined location on the vehicle means; an article of commerce means disposed over said predetermined location to be engaged to said predetermined location by vacuum means within said second conduit means;

said article of commerce means comprises a suitcase, said suitcase having at least one suction cup means secured thereto for disposing over said predetermined location to communicate with said second conduit means; said suitcase comprises an accessible compartment; a compartment conduit extending from said accessible compartment to said suction cup means such as to communicate with the same; and a compartment valve means disposed within said accessible compartment and at an end of said compartment conduit for releasing any vacuum within said suction cup means such that the suitcase can be removed off of said predetermined location.

2. The retainer means of claim 1 wherein said suction cup means comprises a suction valve for releasing the vacuum from said suction cup means.

3. The retainer means of claim 1 wherein said vacuum receiving chamber means comprises a pair of first back pressure valve means in communication with said first conduit means and said pair of second conduit means.

4. The retainer means of claim 3 each of said back pressure valve means of said second conduit being electrically engaged to means said solenoid regulator means.

5. The retainer means of claim 3 wherein each of said second conduit means terminates in a conduit suction cup means.

* * * * *